United States Patent
Collins et al.

(10) Patent No.: US 6,268,448 B1
(45) Date of Patent: Jul. 31, 2001

(54) IMINOPHOSPHONAMIDE COMPLEXES FOR OLEFIN

(75) Inventors: Scott Collins, Waterloo (CA); Rainer Vollmerhaus, Eindhoven (NL); Qinyan Wang, Calgary (CA)

(73) Assignees: University of Waterloo, Ontario; Nova Chemical Corporation, Alberta, both of (CA)

( * ) Notice: Subject to any disclaimer, the term of this patent is extended or adjusted under 35 U.S.C. 154(b) by 0 days.

(21) Appl. No.: 09/371,058

(22) Filed: Aug. 9, 1999

(30) Foreign Application Priority Data

Sep. 28, 1998 (CA) .................................................. 2248463

(51) Int. Cl.$^7$ ...................................................... C08F 4/64
(52) U.S. Cl. ........................ 526/161; 526/127; 526/159; 526/160; 526/352; 526/943
(58) Field of Search ..................... 526/127, 159, 526/160, 161, 352, 348.4, 348, 943

(56) References Cited

U.S. PATENT DOCUMENTS

| | | |
|---|---|---|
| 5,318,935 | 6/1994 | Canich et al. . |
| 5,707,913 | 1/1998 | Schlund et al. . |

FOREIGN PATENT DOCUMENTS

| | | |
|---|---|---|
| 0 687 693 A1 | 6/1995 | (EP) . |
| 09012619-A2 * | 1/1997 | (JP) . |
| WO-9618658-A1 * | 6/1996 | (WO) . |

OTHER PUBLICATIONS

A. Recknagel, M. Witt & F. Edelmann, Synthese von Metallacyclophosphazenen mit Praseodym, Neodym, Uran and Thorium, Journal of Organometalic Chemistry, 371, 1989, The Netherlands (no month).

M. Witt, H. Roesky, D. Stalke, F.Pauer, T. Henkel & G. Sheldrick, Synthesis and Crystal Structures of Three Four--membered Ring Compounds Containing $Pn_2Ti$ Skeletons, J.Chem. Soc., 1989, Germany (no month).

Henri–Jean Cristau & Chantal Garcia, Synthesis of Diaminodiphenylphosphonium Salts, C. Synthesis, 1990, 315–317, France (no month).

V. Chandrasekhar, T.Chivers, S. Kumaravel, A. Meetsma, and J. Grampel Prep. of 1,1,5,5–Tetraphenyl–3,7–dairyl–1, 5–diphosphatatetrazocines & 1,1,3,3,5–Pentaphenyldiphosphatriazine and the X-ray Structure of 1,5–$Ph_4P_2N_4C_2(C_6H_4CH_3-4)_2$, Inorg. Chem. 1991, 30, 3402–3407 (no month).

A. Recknagel, A. Seiner, M. Noltemeyer, S. Brooker, D. Stalke & R. Edelmann, Diiminophosphinate des Litiums, Samariums und Ytterbiums: Molekulstrukturen von Li[$Ph_2P(NSiMe_3)$ 2ISm(u–I)$_2$(THF)$_2$ Journal of Organometallic Chemistry, 414, 1991, 327–335, Germany (no month).

U.Kilimann, M. Noltemeyer, M. Schafer, R. Herbst–Irmer, H. Schmidt & F. Edelmann, Cyclooctatetraenyl–Komplexe der fruhen Ubergangsmetalle und Lanthanoide, Journal of Organmettalic Chemistry, 469, 1994, C27–C30, Germany (no month).

G. Diamond, R. Jordan, and J. Petersen, Efficient Synthesis of Chiral ansa–Metallocenes by Amine Elimination, Synthesis, Structure, and Reactivity of rac–(EBI)Zr(NMe$_2$)$_2$, J. Am. Chem. Soc. 1996, 8024–8033, (no month).

K. Paciorek and R. Kratzer, Reactions of Triphenylsiyl Azide with Tetraphenyldiphosphine and Diphenylphosphine, J. Org. Chemistry, 1996, 31, 2426–2427. (no month).

* cited by examiner

Primary Examiner—David W. Wu
Assistant Examiner—Caixia Lu
(74) Attorney, Agent, or Firm—Kenneth H. Johnson

(57) ABSTRACT

The present invention relates to the use of complexes of transition metals having a ligand containing a phosphorus or arsenic atom bound to the transition metal through an oxygen atom, or an amido radical. The complexes may be activated with conventional activators and are useful in solution, slurry and gas phase polymerization of olefins.

35 Claims, No Drawings

IMINOPHOSPHONAMIDE COMPLEXES FOR OLEFIN

FIELD OF THE INVENTION

The present invention relates to the use of iminophosphonamide complexes with transition metals for the polymerization of olefins. Generally the iminophosphonamide ligands have the formula $[(R^1)_2P(=NR^2)NR^2]$. The complexes may be bis iminophosphonamide complexes or may be mono-iminophosphonamide complexes together with another ligand such as a cyclopentadienyl (Cp) ligand.

BACKGROUND OF THE INVENTION

Iminophosphonamide complexes have been known for some time. However, there has been no disclosure that such compounds may be used to polymerize monomers, such as olefins, more particularly alpha olefins such as ethylene and its higher homologues.

BASF's European Patent 0 687 693 A1 (corresponding to U.S. Pat. No. 5,707,913 issued on Jan. 13, 1998) discloses complexes with following structure used as polymerization catalysts:

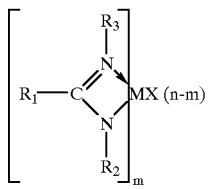

where, M represents a metal from IIIb, IVb, Vb or VIb of the periodic table of elements or a metal from the lanthanide group, X is a negative leaving atom or a negative leaving group, which may be identical or different if (n–m)>1, $R^1$, $R^2$ and $R^3$ are each a C-organic or Si-organic radicals, n is the valence of M in the metal complex, and m is from 1 to 5, with the proviso that n–m=0. The metal complex is activated with an activator in a molar ratio of activator to metal complex from 0.5:1 to 10,000:1. While the complex of the BASF patent to some extent looks similar to those of the present invention the ligands do not contain a phosphorus atom between the two nitrogen atoms of the ligand. Accordingly, the BASF patent does not teach the subject matter of the present invention.

Exxon's U.S. Pat. No. 5,318,935 discloses complexes having the following structure:

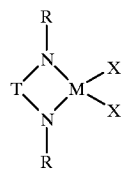

wherein M is zirconium, hafnium or titanium, N is a nitrogen atom having three substituents; each "X" is independently, any univalent anionic ligand selected from the group consisting of halide, hydride, straight, branched, or aromatic hydrocarbyl radicals, alkoxide, aryloxide, amide having singly or multiply branched hydrocarbyl radicals having between 3 and 30 carbon atoms or, arylamide, phosphide and arylphosphide. "T" is a covalent bridging group selected from the group consisting of unsubstituted hydrocarbyls and substituted hydrocarbyls containing a Group IV-A or VI-A element; and each "R" is independently or any radical containing a Lewis basic functionality; and alumoxane as cocatalyst. The reference teaches away from the subject matter of the present invention as the bridging group between two nitrogen atoms does not include a phosphorus or arsenic atom required by the present invention.

J. Organomet. Chem. 371 (1989) C40–C44 discloses the synthesis of complexes having the formula:

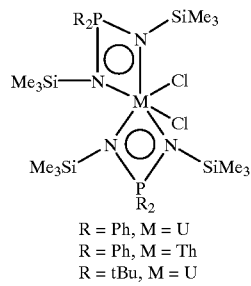

R = Ph, M = U
R = Ph, M = Th
R = tBu, M = U

The reference does not teach the use of the complexes for the polymerization of olefins.

J. Organomet. Chem. 469 (1994) C27–C30 teaches the synthesis of the following complex:

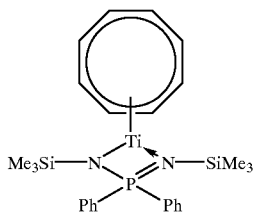

The reference does not teach polymerization of olefins using such a complex.

The following structures have been disclosed in J. Chem. Soc. Dalton Trans 1989, 2173.

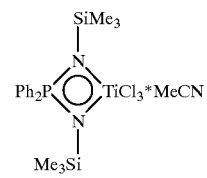

A

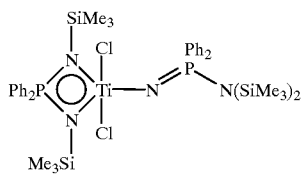

B

The paper contains no polymerization data, nor does it suggest that such complexes may have utility as polymerization catalysts for olefins.

J. Organomet. Chem. 414 (1991) 327–335 discloses the synthesis of the following complexes:

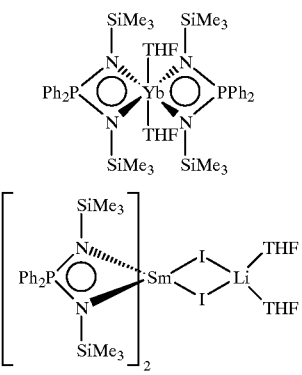

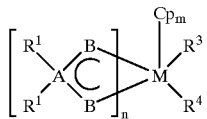

Again no polymerization data is given in the paper nor is there any suggestion that the complexes would be useful in the polymerization of olefins.

The present invention seeks to provide a novel process for the polymerization of olefins using iminophosphonamide complexes with transition metals.

SUMMARY OF THE INVENTION

The present invention provides a process for the polymerization of one or more olefins in the presence of a catalyst precursor having an empirical structure of the formula:

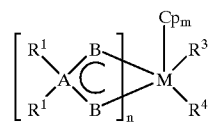

wherein A is selected from a phosphorus atom and an arsenic atom; each B is independently selected from the group consisting of an oxygen atom and a radical of the formula $NR^2$, wherein each $R^2$ is independently selected from the group consisting of a hydrogen atom, a $C_{1-10}$ alkyl radical which is unsubstituted or up to fully substituted by one or more halogen atoms, a $C_{6-10}$ aryl radical which is unsubstituted or up to fully subsituted by one or more halogen atoms, and trialkyl silyl radicals of the formula —$Si(R^5)_3$ wherein each $R^5$ is independently selected from the group consisting of a hydrogen atom and a Cab alkyl radical; each RX is independently selected from the group consisitng of a hydrogen atom, a $C_{1-10}$ alkyl radical which is unsubstituted or up to fully substituted by one or more halogen atoms, and a $C_{6-10}$ aryl radical which is unsubstituted or up to fully subsituted by one or more halogen atoms; $R^3$ and $R^4$ are independently selected from the group consisting of a hydrogen atom, a halogen atom, or a $C_{1-8}$ alkyl radical. M is a transition metal selected from the group consisiting of Ti, Zr, Hf, and V; n is 1 or 2; m is 0 or 1 provided that the sum of n+m=2 and Cp is $C_{5-13}$ ligand containing a 5-member carbon ring having delocalized bonding within the ring and typically being bound to the transition metal M through covalent $\eta^5$-bonds which is unsubstituted or up to fully substituted by one or more substituents selected from the group consisting of a halogen atom, a $C_{1-4}$ alkyl radical, and an amido radical which is unsubstituted or substituted by up to two $C_{1-4}$ alkyl radicals; and an activator.

BEST MODE

The term 'scavenger as used in this specification is meant to include those compounds effective for removing polar impurities from the reaction solvent. Such impurities can be inadvertently introduced with any of the polymerization reaction components, particularly with solvent, monomer and catalyst feed, and adversely affect catalyst activity and stability. It can result in decreasing or even elimination of catalytic activity, particularly when an activator capable of ionizing the group 4 metal complex is also present.

The invention provides a solution, slurry or gas phase process for the polymerization of one or more aliphatic or aromatic hydrocarbyl $C_{2-10}$ mono- or di-olefins at a temperature from room temperature (e.g. about 20° C.) to about 300° C., preferably from 80° C. to 280° C. at pressures up to about $1.034 \times 10^6$ kPa (about 15,000 psi), in the presence of a catalyst precursor having an empirical structure of the formula:

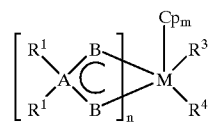

wherein A is selected from a phosphorus atom and an arsenic atom, preferably phosphorus; each B is independently selected from the group consisting of an oxygen atom atom and a radical of the formula $NR^2$, wherein each $R^2$ is independently selected from the group consisting of a hydrogen atom, a $C_{1-10}$ alkyl radical which is unsubstituted or up to fully substituted by one or more halogen atoms, preferably chlorine or go fluorine; a $C_{6-10}$ aryl radical which is unsubstituted or up to fully subsituted by one or more halogen atoms, preferably chlorine or fluorine, and trialkyl silyl radicals of the formula —$Si(R^5)_3$ wherein each $R^5$ is independently selected from the group consisting of a hydrogen atom and a $C_{1-4}$ alkyl radical, preferably B is a radical of the formula $NR^2$; each $R^1$ is independently selected from the group consisitng of a hydrogen atom, a $C_{1-10}$ alkyl radical which is unsubstituted or up to fully substituted by one or more halogen atoms, preferably chlorine or fluorine and a $C_{6-10}$ aryl radical which is unsubstituted or up to fully subsituted by one or more halogen atoms, preferably chlorine or fluorine; $R^3$ and $R^4$ are independently selected from the group consisting of a hydrogen atom, a halogen atom, a $C_{1-8}$ alkyl radical, and a $C_{6-10}$ aryl radical. M is a transition metal selected from the group consisiting of Ti, Zr, Hf and V; n is 1 or 2; m is 0 or 1 provided that the sum of n+m=2 and Cp is $C_{5-13}$ ligand containing a 5-member carbon ring having delocalized bonding within the ring and typically being bound to the transition metal M through covalent $\eta^5$-bonds, preferably cyclopentadienyl, indenyl or fluorenyl; which is unsubstituted or up to fully substituted by one or more substituents selected from the group consisting of a halogen atom, preferably chlorine or fluorine, a $C_{1-4}$ alkyl radical or an amido radical which is unsubstituted or substituted by up to two $C_{1-4}$ alkyl radicals; and an activator.

In a further embodiment of the present invention the precursor may be of the formula:

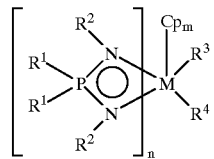

wherein each $R^1$ is independently selected from the group consisitng of a hydrogen atom, a $C_{1-10}$ alkyl radical which is unsubstituted or up to fully substituted by one or more chlorine or fluorine atoms and a C6-10 aryl radical which is unsubstituted or up to fully subsituted by one or more chlorine or fluorine atoms; each $R^2$ is independently selected from the group consisting of a hydrogen atom, a $C_{1-10}$ alkyl radical which is unsubstituted or up to fully substituted by one or more chlorine or fluorine atoms; a $C_{6-10}$ aryl radical which is unsubstituted or up to fully substituted by one or more chlorine or fluorine atoms, and trialkyl silyl radicals of the formula —$Si(R^5)_3$ wherein in each $R^5$ is independently selected from the group consisting of a hydrogen atom and a $C_{1-4}$ alkyl radical; $R^3$ and $R^4$ are independently selected from the group consisting of a hydrogen atom, a chlorine or fluorine atom, a $C_{1-8}$ alkyl radical and a $C_{6-10}$ aryl radical; M is a transition metal selected from the group consisting of Ti, Zr, Hf and V; n is 1 or 2; m is 0 or 1 provided that the sum of n+m=2 and Cp is a cyclopentadienyl, indenyl or fluorenyl ligand which is unsubstituted or up to fully substituted by a halogen atom, preferably chlorine or fluorine, a $C_{1-4}$ alkyl radical or an amido radical which is unsubstituted or substituted by up to two $C_{1-4}$ alkyl radicals having delocalized bonding within the ring and typically being bound to the group 4 metal (M) through covalent $\eta^5$-bonds.

In the complexes defined by the above formula preferably each $R^1$ is independently selected from the group consisting of methyl, ethyl, and phenyl radicals; each $R^2$ is independently selected from the group consisting of methyl, ethyl, phenyl, benzyl, tolulyl and trimethyl silyl radicals; and $R^3$ and $R^4$ are independently selected from the group consisting of methyl, ethyl radicals and a chlorine atom, most preferably a methyl radical or a chlorine atom.

The process for the polymerization may be a gas phase process, a solution process or a slurry process.

Solution and dispersion polymerization processes are fairly well known in the art. These processes are conducted in the presence of an inert hydrocarbon or hydrocarbyl solvent typically a $C_{5-12}$ hydrocarbon which may be unsubstituted or substituted by $C_{1-4}$ alkyl group, such as pentane, hexane, heptane, octane, cyclohexane, methylcyclohexane and hydrogenated naphtha. An additional solvent is Isopar E ($C_{8-12}$ aliphatic solvent, Exxon Chemical Co.).

The polymerization may be conducted at temperatures from about room temperature to about 300° C., preferably less than about 280° C. Depending on the process this temperature may be relatively low such as from room temperature, preferably from about 80° C. to about 120° C. for slurry polymerization. For solution polymerization the temperatures may range from about 140° C., preferably at least 160° C. to about 280° C. Commercially, the pressure of reaction may be in the range from about 20680 kPa to 34475 kPa (about 3,000 to 5,000 psi).

The polymerization process may be a gas phase process as described in patents in the name of Union Carbide Corporation. Generally the reaction may take place at temperatures from about 80° C. to 120° C. and at pressures up to about 2068 kPa (300 psi). The catalyst is introduced on a support, typically a silica or alumina support and fluidized by the gas flow through the reactor bed. The gas flow comprises of monomers and may also comprise inert gas, hydrogen for molecular weight control and optionally an inert condensable gas, generally a hydrocarbon gas to remove the heat of reaction in the so called condensing mode of operation.

Suitable olefin monomers may be ethylene and $C_{2-10}$ mono- and di-olefins. Preferred monomers include ethylene and $C_{3-10}$ alpha olefins which are unsubstituted or substituted by up to two $C_{1-4}$ alkyl radicals. Illustrative nonlimiting examples of such alpha-olefins are one or more of ethylene, propylene, 1-butene, 1-pentene, 1-hexene and 1-octene.

The polyethylene polymers which may be prepared in accordance with the present invention typically comprise not less than 60, preferably not less than 70 weight % of ethylene and the balance one or more $C_{4-10}$ alpha olefins, preferably selected from the group consisting of 1-butene, 1-hexene and 1-octene. The polyethylene prepared in accordance with the present invention may be linear low density polyethylene having a density from about 0.910 to 0.935 g/cc or (linear) high density polyethylene having a density above 0.935 g/cc. The present invention might also be useful to prepare polyethylene having a density below 0.910 g/cc— the so called very low and ultra low density polyethylenes.

The present invention may also be used to prepare co- and terpolymers of ethylene, propylene and optionally one or more diene monomers. Generally, such polymers will contain about 50 to about 75 weight % ethylene, preferably about 50 to 60 weight % ethylene and correspondingly from 50 to 25 weight % of propylene. A portion of the monomers, typically the propylene monomer, may be replaced by a conjugated diolefin. The diolefin may be present in amounts up to 10 weight % of the polymer although typically is present in amounts are about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene. Particularly preferred dienes are 5-ethylidene-2-norbornene and 1,4-hexadiene.

Other olefin polymers which may be prepared in accordance with the present invention may be determined by one of ordinary skill in the art using non inventive testing.

The polymers prepared in accordance with the present invention have a good molecular weight. That is the molecular weight (Mw) will typically be greater than about 5,000 preferably greater than 25,000.

The above complex is a catalyst precursor which is used in conjunction with a cocatalyst or activator.

The activator may be selected from the group consisting:
i) an aluminoxane; and
ii) a combination of an alkylating activator which also serves as a scavenger other than aluminoxane and an activator capable of ionizing the group 4 metal complex.

The aluminoxane activator may be of the formula $(R^6)_2AlO(R^6AlO)_mAl(R^6)_2$ wherein each $R^6$ is independently selected from the group consisting of $C_{1-20}$ hydrocarbyl radicals and m is from 0 to 50, preferably $R^6$ is a $C_{1-4}$ alkyl radical and m is from 5 to 30. The aluminoxane activator may be used prior to the reaction but preferably in situ alkylation is typical (e.g. alkyl groups replacing $L^1$, hydrogen or halide groups).

If the group 4 metal complex is activated only with aluminoxane, the amount of aluminoxane will depend on the reactivity of the alkylating agent. Activation with aluminoxane generally requires a molar ratio of aluminum in the activator to group 4 metal in the complex is greater than or equal to about 200:1; preferably greater than 500:1; potentially extending up to 1000:1 and greater. MAO may be at the higher end of the above noted range.

The activator of the present invention may be a combination of an alkylating activator which also serves as a scavenger other than aluminoxane in combination with an activator capable of ionizing the group 4 complex.

The alkylating activator which also serves as a scavenger may be selected from the group consisting of consisting of ($R^{11}{}_p MgX_{2-p}$ wherein X is a halide and each $R^{11}$ is independently selected from the group consisting of $C_{1-10}$ alkyl radicals and p is 1 or 2; $R^{11}Li$ wherein in $R^{11}$ is a defined above; $(R^{11})_q ZnX_{2-q}$ wherein $R^{11}$ is as defined above, X is halogen and q is 1 or 2; $(R^{11})_s AlX_{3-s}$ wherein $R^{11}$ is as defined above, X is halogen and s is an integer from 1 to 3. Preferably in the above compounds $R^{11}$ is a $C_{1-4}$ alkyl radical, and X is chlorine. Commercially available compounds include triethyl aluminum (TEAL), diethyl aluminum chloride (DEAC), dibutyl magnesium $((Bu)_2Mg)$, and butyl ethyl magnesium (BuEtMg or BuMgEt).

The activator capable of ionizing the group 4 metal complex may be selected from the group consisting of:

i) compounds of the formula $[R^7]^+[B(R^8)_4]^-$ wherein B is a boron atom, $R^7$ is a cyclic $C_{5-7}$ aromatic cation or a triphenyl methyl cation and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^{10})_3$; wherein each $R^9$ is independently selected from the group consisting of a hydrogen atom and a $C_{1-4}$ alkyl radical; and ii) compounds of the formula $[(R^9)_t ZH]^+[B(R^8)_4]^-$ wherein B is a boron atom, H is a hydrogen atom, Z is a nitrogen atom or phosphorus atom, t is 3 and $R^9$ is selected from the group consisting of $C_{1-8}$ alkyl radicals, a phenyl radical which is unsubstituted or substituted by up to three $C_{1-4}$ alkyl radicals, and $R^8$ is as defined above; and iii) compounds of the formula $B(R^8)_3$ wherein $R^8$ is as defined above. In the above compounds preferably $R^8$ is a pentafluorophenyl radical.

The activator capable of ionizing the group 4 metal complex abstract one or more $L^1$ ligands so as to ionize the group 4 metal center into a cation but not to covalently bond with the group 4 metal and to provide sufficient distance between the ionized group 4 metal and the ionizing activator to permit a polymerizable olefin to enter the resulting active site. In short the activator capable of ionizing the group 4 metal complex maintains the group 4 metal in a+1 valence state, while being sufficiently liable to permit its displacement by an olefin monomer during polymerization.

Readily commercially available activators which are capable of ionizing the group 4 metal complexes include: N,N-dimethylaniliumtetrakispentafluorophenyl borate, triphenylmethylium tetrakispentafluorophenyl borate (e.g. $[Ph_3C][B(C_6F_5)_4]$), and trispentafluorophenyl boron.

The present invention will now be illustrated by the following nonlimiting examples:

Reagents

The following reagents were used as provided unless otherwise noted: $Ph_2PH$, $Et_2PH$ (Strem), $Ph_2PCl$ (Aldrich, distilled 0.01 mm prior to use) $Cl_2$ (Linde), MeLi (1.4M in $Et_2O$, Aldrich, titrated with 1,3 -diphenylacetone-p-tosylhydrazone before use). $CpZr(NMe_2)_3$ and $Zr(NMe_2)_4$ were prepared via literature procedures in J. Chem. Soc. A 1968, 1940 and J. Am. Chem. Soc. 1996, 118, 8024.

Instrumentation $^{31}P$ {H} NMR spectra were obtained in the solvent indicated. If the solvent was undeuterated then the experiment was run with the sample unlocked. All spectra were referenced versus external 85% $H_3PO_4$ in $D_2O$ and obtained with proton decoupling. Spectra were obtained on a Bruker AC 200 spectrometer. $^1H$ and $^{13}C$ {H} NMR spectra were obtained on either a Bruker AC 200, AM250 or AC 300 spectrometer. Elemental analyses were performed by M.H.W. or Oneida Laboratories.

$Ph_2PCl_3$

In a typical reaction, $Ph_2PCl$ (17.0 mL, 94.7 mmol, d=1.229) was placed in a Schlenk flask along with toluene (200 mL). The flask was cooled to −15° C. and stirred. A slow stream of chlorine gas was passed intermittently over the toluene solution over 15 minutes until a yellow colour persisted in solution and a fluffy white powder was formed. The flow was then stopped and vacuum applied to remove the excess chlorine. The slurry was transferred into the glovebox and the solid was filtered and washed with two portions of hexanes. Drying in vacuo gave a fluffy, white powder (24.7 g, 89%). Spectral data agreed with literature values from J.C. Inorg. Chem. 1991, 30, 3402.

Solid Methyllithium

An Aldrich SureSeal bottle was opened up and the MeLi solution removed. About 90% of the solvent was removed in vacuo and then hexanes (50 mL) was added to cause the precipitation of a large amount of white solid. This process (reducing the volume and then adding hexanes) was repeated two more times and then the slurry pumped to dryness. $^1H$ NMR spectroscopy showed that there was a small amount of residual $Et_2O$ (less than 1%), but that the only other proton source was MeLi. From later reactions it became apparent that the solid contains only 69 mol % MeLi. The residual solid is most likely LiCl.

Diphenyl(trimethtlsiltlamino)(trimethylsilylimino) phosphorane (1)

This compound was synthesized using a literature procedure in the J. Org. Chem. 1966, 31, 2426. $Ph_2PH$ (3.00 ml, 17.2 mmol, d=1.07) and $N_3SiMe_3$ (5.00 ml, 35.8 mmol, d=0.868, 95%) were refluxed overnight in a round bottom flask with a reflux condenser under a positive pressure of nitrogen. After 12 hours the reflux was stopped and the product was distilled through a short path distillation apparatus (0.01 mm, 129° C.) to yield a clear liquid (5.28 g, 85%). Spectral data agreed with literature values. $^1H$ NMR $(C_6D_6)$: δ 7–7.75 (br m, $C_6H_5$, 10H), 1.88 (br s, NH, 1H), 0.34 (s, $SiCH_3$, 9H), 0.18 s, $SiCH_3$, 9H). $^{31}P$ {$^1H$} NMR. {$^1H$} $(C_6D_6)$: δ 0.06 (s).

Diethyl(trimethylsilylamino)(trimethylsilylimino) phosphorane (2)

This compound was synthesized as above by using $Et_2PH$ instead of $Ph_2PH$. $Et_2PH$ (2.00 mL, 17.4 mmol, d=0.7862) and $N_3SiMe_3$ (5.00 mL, 35.8 mmol, d=0.868, 95%) were refluxed overnight in a round bottom flask with a reflux condenser under a positive pressure of nitrogen. After 12 hours the product was distilled through a short path distillation apparatus (0.01 mm, 56–60° C.) to yield a clear liquid (3.30 g, 72%). $^1H$ NMR $(C_6D_6)$: δ 1.12 (overlapping dq, $CH_2$, 4H), 0.84 (overlapping dt, CH3, $J_{HP}$=17.3 Hz, $J_{HH}$=7.4 Hz, 6H), 0.73 (br s, NH, 1H), 0.29 (s, $SiCH_3$, 18H). $^{13}C${$^1H$} NMR $(C_6D_6)$: δ 26.6 (d, $PCH_2CH_3$, $J_{CP}$=78.2 Hz), 6.5 (d, $PCH_2CH_3$, $J_{CP}$=3.7 Hz), 3.3 (exchange broadened s, $SiMe_3$); $^{31}P${$^1H$} NMR $(C_6D_6)$: δ 20.1. Analysis calculated for $C_{10}H_{29}N_2PSi_2$: C, 45.41; H, 6.06; N, 4.81. Found: C, 68.73; H, 6.13; N, 4.73.

Diphenyl(benzylamino)(benzylimino)phosphorane hydrochloride (3)

In a typical reaction, $Ph_2PCl_3$ (5.00 g, 17.1 mmol) was placed in a Schlenk flask with $CH_2Cl_2$ (200 mL). The solution was cooled to 0° C. and the appropriate amine was added over about 30–60 minutes ($BzNH_2$ (7.49 mL, 68.6 mmol, d=0.981). During addition, a large amount of white solid (identified as $RNH_3Cl$) precipitates. Once the addition was complete, the solution was refluxed overnight to insure complete reaction. After 12 hours, the solution was filtered in the air and the filtrate pumped to dryness. The resulting white solid was recrystallized from $CH_2Cl_2$/hexanes. Often this did not result in a solid but in a large quantity of oil which was easily separated. Residual solvent can be removed by heating overnight in vacuo to give a white crystalline solid (6.65 g, 89%). Spectral data were virtually identical with the corresponding compounds reported by Garcia and Cristau in C. Synthesis, 1990, 315–317. We note, that in our hands, this literature preparation gave mixed halide complexes, rather than pure hydrochloride complexes as reported by these authors. Hence the modified procedure here was followed. $^1H$ NMR ($CDCl_3$): $\delta$ 7.94–7.89 and 7.43–7.04 (br m, 21H, $C_6H_5$ and NH), 3.97 (dd, 4H, $CH_2Ph$, $^3J_{PH}$=13 Hz, $2J_{HH}$=7 Hz). $^{31}P\{H\}$ NMR ($CH_2Cl_2$): $\delta$ 38.3. Analysis calculated for $C_{26}H_{26}PN_2Cl$: C, 72.13; H. 6.05; N, 6.47; Found: C, 71.57; H, 6.11; N, 6.13.

Diphenyl(benzylamino)(benzylimino)phosphorane (4)

A solution of 3 (3.00 g, 6.94 mmol) in 100 mL dry $CH_2Cl_2$ was placed in a 500 mL Schlenk flask under $N_2$ and cooled to 0° C. in an ice bath. A diethyl ether solution of potassium t-butoxide (0.79 g, 7.0 mmol) was added to the flask by cannula. The reaction mixture was stirred for 5 minutes and the volatiles were removed under vacuum. The remaining solid was extracted with toluene. Removal of toluene from the extract afforded a white solid which was further purified by recrystallization from toluene and hexane. Yield: 2.2 g (5.6 mmol, 81%). $^1H$ NMR ($CDCl_3$): $\delta$ 7.9–7.2 (20H, aromatic protons), 4.22 (d, 4H, $NCH_2Ph$, $^3J_{PH}$=14.0 Hz); $^{13}C\{^1H\}$ NMR ($CDCl_3$): $\delta$ 132.2, 132.0, 131.2, 128.6, 127.5, 126.4 (aromatic carbons), 46.1 ($NCH_2Ph$); $^{31}P\{^1H\}$ NMR ($CDCl_3$): 8 14.2. Analysis calculated for $C_{26}H_{25}PN_2$: C, 78.77; H, 6.36; N, 7.07. Found: C, 79.00; H, 6.37; N, 6.86.

Diphenyl(p-tolylamino) (p-tolylimino)phosphorane hydrochloride (5)

A solution of p-tolyl$NH_2$ (14.7 g, 137 mmol) in $CH_2Cl_2$ (100 mL) was added to a solution of $Ph_2PCl_3$ (10.000 g, 34.3 mmol) in $CH_2Cl_2$ (200 ml). The reaction was worked up in a similar manner as described above for the preparation of 3. This resulted in a white powder (14.22 g, 96%). $^1H$ NMR ($CDCl_3$): $\delta$ 9.79 (d, 1H, NH, $^3J_{PH}$=11 Hz), 8.07–7.99 and 7.52–7.27 (br m, 10H, $C_6H_5$), 7.18 and 6.69 (AB doublets, 8H, $C_6H_4CH_3$, $^3J_{HH}$=8.0 Hz), 2.06 (s, 6H, $C_6H_4CH_3$). $^{31}P\{H\}$ NMR ($CH_2Cl_2$): 3 28.0. Analysis calculated for $C_{26}H_{26}PN_2Cl$: C, 72.13; H, 6.05; N, 6.47. Found: C, 72.27; H, 6.20; N, 6.18.

Diphenyl(p-tolylamino) (p-tolylimino)phosphorane (6)
Method A

To a 500 mL Erlenmeyer flask, was added 150 mL $CH_2Cl_2$ solution of 5 (5.00 g, 11.6 mmol) and 100 mL 3% KOH aqueous solution. The mixture was vigorously stirred for 5 minutes, and the $CH_2Cl_2$ layer was then separated. The aqueous layer was extracted with $CH_2Cl_2$ (2×50 mL). The extract was combined and dried over anhydrous $MgSO_4$. Filtration and removal of $CH_2Cl_2$ in vacuum afforded free ligand as a white crystalline solid. Yield: 4.50 g (11.4 mmol, 98%). $^1H$ NMR ($CDCl_3$): $\delta$ 7.93, 7.42, 6.94 (18H, aromatic protons), 5.31 (s, 1H, NM, 2.21 (s, 6H, $NPhCH_3$).
Method B Compound 5 (2.00 g, 4.6 mmol) was placed in a Schlenk flask with $KCH_2Ph$ (602 mg, 4.6 mmol) and toluene (30 mL) was added and the mixture allowed to stir for one hour. The resulting solution was filtered through Celite and the filtrate was reduced to dryness to produce a white solid (1.59 g, 87%). $^1H$ NMR ($C_6D_6$): $\delta$ 8.01–7.93 and 7.15–6.86 (br m, 18H, $C_6H_5$ and $C_5H_4CH_3$), 4.85 (br s, 1H, NH), 2.06 (s, 6H, $C_6H_4CH_3$). $^{13}C\{^1H\}$ NMR ($CDCl_3$): $\delta$ 132.7, 132.0, 131.9, 131.7, 129.7, 129.9, 128.7, 120.9 ($C_6H_5$ and $C_6H_4CH_3$), 20.6 ($C_6H_4CH_3$). $^{31}P\{H\}$ NMR ($CDCl_3$): $\delta$ –5.1. Analysis calculated for $C_{26}H_{25}PN_2$: C, 78.77; H, 6.36; N, 7.07. Found: C, 8.62; H, 6.30; N, 6.90.

$[Ph_2P(NCH_2Ph)_2]_2ZrCl_2$ (7)

Compound 3 (5.083 g, 11.74 mmol) was slowly added to a solution of $Zr(NMe_2)_4$ (1.57 g, 5.87 mmol) in toluene (200 mL) and allowed to stir for several hours. Partial vacuum was applied periodically throughout the reaction to insure that there was always a negative pressure inside the flask. After 12 hours the toluene was removed in vacuo and spectral data go were obtained. The product was purified either by recrystallization from $CH_2Cl_2$/hexanes or single crystals were obtained by dissolving the solid in a minimal amount of hot toluene and allowing it to stand overnight. In this fashion 4.95 g of a white solid was obtained (88%). $^1H$ NMR ($C_6D_6$): $\delta$ 7.60–7.55, 7.32–7.27, and 7.15–6.87 (br m, 40H, $C_6H_5$), 4.62 (d, 8H, $CH_2Ph$, $^3J_{HP}$=26 Hz). $^{13}C\{H\}$ NMR ($CDCl_3$): $\delta$ 141.2, 133.2–132.0 and 128.8–126.4 ($C_6H_5$), 51.7 ($CH_2Ph$). $^{31}P\{H\}$ NMR ($CH_2Cl_2$): $\delta$ 45.8. Analysis calculated for $C52H_{48}PN_4ZrCl_2$: C, 65.53; H, 5.08; N, 5.88. Found: C, 65.72; H, 5.29; N, 5.81.

$[Ph_2P(N-p-tolyl)_2]_2ZrCl_2$ (8)

Compound 5 (7.000 g, 16.17 mmol) was slowly added to a solution of $Zr(NMe_2)_4$ (2.16 g, 8.08 mmol) in toluene (200 mL) and allowed to stir for several hours at room temperature. The reaction was worked up as described above for the preparation of 7 to produce a white solid (6.54 g, 85%). $^1H$ NMR (CDCl: $\delta$ 7.54–7.45 and 7.28–7.21 (br m, 10H, $C_6H_5$), 6.89 (d, 4H, m-$C_6H_4CH_3$, $^3J_{HH}$=8.2 Hz), 6.72 (dd, 4H, o-$C_6H_4CH_3$, $^3J_{HH}$=8.2 Hz, $^3J_{PH}$=1.9 Hz), 2.28 (s, 6H, $C_6H_4CH_3$). $^{13}C\{H\}$ NMR ($CDCl_3$): $\delta$ 143.1, 133.6–132.2 and 129.2–125.6, and 116.4 ($C_6H_5$ and $C_6H_4CH_3$), 20.8 ($C_6H_5CH_3$). $^{31}$ $P\{H\}$ NMR ($CH_2Cl_2$): $\delta$ 34.8. Analysis calculated for $C_{52}H_{48}P_2N_4ZrCl_2$: C, 65.53; H, 5.08; N, 5.88. Found: C, 65.36; H, 5.20; N, 5.74.

$[Ph_2P(NCH_2Ph)_2]_2ZrMe_2$ (9)

Complex 8 (1.50 g, 1.57 mmol) was placed in a Schlenk flask with 100 mL of toluene. MeLi (1.908 mL, 1.65M, 3.14 mmol) was added via syringe to the solution at room temperature over about 5 minutes. The mixture was allowed to stir for 1 hour and then the solvent was removed in vacuo. The solids were redissolved in about 10 mL of $CH_2Cl_2$ and then filtered through Celite. The flask and Celite were washed with two additional portions of $CH_2Cl_2$. Removal of solvent resulted in a white, crystalline powder (1.10 g, 77%). $^1H$ NMR ($C_6D_6$): $\delta$ 7.57–7.50 and 7.27 6.93 (br m, 40H, $C_6H_5$), 4.48 (d, 8H, $CH_2C_6H_5$, $^3J_{PH}$=26 Hz), 1.15 (s, 6H, $CH_3$). $^{13}C\{H\}$ NMR($CDCl_3$): $\delta$ 142.8 and 132.6–125.8 ($C_6H_5$), 49.9 ($CH_2Ph$), 40.0 (t, $ZrCH_3$, $^3J_{CP}$=3.4 Hz). $^{31}P\{H\}$ NMR ($CH_2Cl_2$): $\delta$ 48.0. Analysis calculated for $C_{54}H_{54}P_2N_4Zr$: C, 71.10; H, 5.97; N, 6.14. Found: C, 70.05; H, 5.87; N, 5.90.

$[Ph_2P(N-p-tolyl)_2]_2ZrMe_2$ (10)

Complex 8 (1.0 g, 1.05 mmol) was placed in a Schlenk with toluene (50 mL), and MeLi (1.61 mL, 2.10 mmol) was syringed in and the solution was allowed to stir for 1 hour. After this time the toluene was removed in vacuo and the solid was redissolved in $CH_2Cl_2$ and filtered. The solvent was removed in vacuo to give a white, crystalline powder. $^1H$ NMR (THF-$D_8$): $\delta$ 7.61–7.08 (br m, 20H, $C_6H_5$), 6.76 and 6.61 (d, 16H, $C_6H_4CH_3$, $^3J_{HH}$=8.0 Hz), 2.19 (s, 12H, $C_6H_4CH_3$), 0.30 (s, 6H, Zr-$CH_3$). $^{13}C\{H\}$NMR ($CDCl_3$): $\delta$ 143.9 and 133.2–125.2 ($C_6H_5$ and $C_6H_4CH_3$), 43.6 (t, $ZrCH_3$, $^3J_{CP}$=3.2 Hz), 20.7 ($C_6H_4CH_3$). $^{31}P\{H\}$ NMR ($CH_2Cl_2$): $\delta$ 35.0.

[Ph$_2$P(N-p-tolyl)$_2$]$_2$Zr(CH$_2$Ph)$_2$(11)

Complex 8 (2.00 g, 2.10 mmol) was placed in a Schlenk flask along with toluene (100 mL). Powdered KCH$_2$Ph (547 mg, 4.20 mmol) was slowly added with stirring. The mixture was allowed to stir for 1 week before the red color of the KCH$_2$Ph disappeared to give a yellow solution. The solvent was removed in vacuo and the resulting solid was redissolved in a small amount of toluene and filtered through Celite. The solid and Celite are washed with two more portions of toluene (20 mL). The filtrate volume was reduced and yellow, single crystals were obtained by layering the solution with hexanes (1.243 g, 56%). $^1$H NMR (CDCl$_3$): δ 7.41–6.46 (br m, 46H, C$_6$H$_5$ and C$_6$H$_4$CH$_3$), 2.41 (s, 4H, CH$_2$Ph), 2.23 (C$_6$H$_5$CH$_3$). $^{31}$P{H} NMR (CH$_2$Cl$_2$): δ 36.2.

Cp[Ph$_2$P(NCH$_2$Ph)$_2$]ZrCl$_2$ (12)

Method A

A solution of CpZr(NMe$_2$)$_3$ (1.00 g, 3.47 mmol) in toluene (50 ml) was prepared in a Schlenk flask. Ligand 4 (1.37 g, 3.47 mmol) was slowly added to the solution. Vacuum was applied to remove the generated NMe$_2$H. The solution was allowed to stir overnight. The next day, Me$_2$NH$_2$Cl (565 mg, 6.93 mmol) was added. The solid slowly dissolved in about 6 hours and vacuum was applied to remove the Me$_2$NH. After 24 hours the solution was reduced almost to dryness and then layered with hexanes producing a white solid. This was washed twice with pentane and dried under vacuum (yield 1.764 g, 82%).

Method B

A solution of CpZr(NMe$_2$)$_3$ (1.50 g, 5.20 mmol) and compound 3 (2.25 g, 5.20 mmol) in toluene (50 mL) was prepared. This was stirred overnight. The next day, Me$_2$NH$_2$Cl (424 mg, 5.20 mmol) was added and the solution was allowed to stir overnight until all of the solid had dissolved. Partial vacuum was applied to remove Me$_2$NH as it was produced. A solid was obtained by reducing the volume of the solution almost to dryness and then adding about 100 mL of pentane. The white solid was collected, washed with pentane and dried in vacuo (2.88 g, 90%). $^1$H NMR (CDCl$_3$): δ 7.67–6.92 (br m, 20H, C$_6$H$_5$), 6.12 (s, 5H, C$_5$H$_5$), 4.22 (d, 4H, CH$_2$Ph, $^3$J$_{HP}$=21 Hz). $^{13}$C{H} NMR (CDCl$_3$): δ 140.4, 132.9–132.5 and 129.2–127.0 (C$_6$H$_5$), 115.5 (C$_5$Hs), 51.7 (CH$_2$Ph). $^{31}$P{H} NMR (CH$_2$Cl$_2$): δ 36.8. Analysis calculated for C$_{31}$H$_{29}$PN$_2$ZrCl$_2$: C, 59.80; H, 4.69; N, 4.50. Found: C, 58.28; H, 4.95; N, 4.25.

Cp[Ph$_2$P(N-p-tolyl)$_2$]ZrCl$_2$ (13)

CpZr(NMe$_2$)$_3$ (2.00 g, 6.94 mmol) and compound 5 (3.00 g, 6.94 mmol) were placed in a Schlenk flask along with toluene (100 mL). The solution was allowed to stir overnight. After 12 hours, Me$_2$NH$_2$Cl (560 mg, 6.94 mmol) was added and the solution was stirred overnight so that all of the solid had dissolved. The volume of the solution was reduced until a solid began to precipitate. The solution was reduced some more (5 mL) and hexanes (100 mL) were added to precipitate all of the material. The mixture was filtered and the solid was washed with 2×20 mL of hexanes. The white solid was dried under vacuum (3.27 g, 77%). $^1$H NMR (CDCl$_3$): δ 7.76–7.49 (br m, 10H, C$_6$H$_5$), 6.90 (d, 4H, m-C$_6$H$_4$CH$_3$, $^3$J$_{HH}$=8.2 Hz), 6.68 (s, 5H, C$_5$H$_5$), 6.61 (dd, 4H, o-C$_6$H$_4$CH$_3$, $^3$J$_{HH}$=8.3 Hz, $^4$J$_{HP}$=1.7 Hz), 2.22 (s, 6H, C$_6$H$_5$CH$_3$). $^{13}$C{H} NMR (CDCl3): δ 142.9 and 133.2–124.9 (C$_6$H$_5$ and C$_6$H$_4$CH$_3$), 116.4 (C$_5$H$_5$), 20.7 (C$_6$H$_4$CH$_3$). P{H} NMR (CH$_2$Cl$_2$): δ 31.9. Analysis calculated for C$_{31}$H$_{29}$PN$_2$ZrCl$_2$: C, 59.80; H, 4.69; N, 4.50. Found: C, 58.40; H, 4.97; N, 4.26.

Cp[Ph$_2$P(NCH$_2$Ph)$_2$]ZrMe$_2$ (14)

Method A

Complex 12 (1.00 g, 1.61 mmol) was placed in a Schlenk flask and THF (25 mL) was added. The mixture was cooled to 0° C. and MeMgBr (1.24 ml, 3.22 mmol) was added rapidly via syringe. The solution was allowed to warm up to room temperature and stirred for 10 minutes. Then the solution volume was reduced to about 2 mL and 25 mL of toluene was added and the volume reduced again. This process was repeated about 3–4 times until no more THF was seen in the $^1$H NMR spectrum of crude material. The residual solid was dissolved in a small amount of CH$_2$Cl$_2$ and the volume was reduced to about 1–2 mL and hexanes (20 mL) were added. This process was repeated 2–3 times to produce a white precipitate which $^1$H NMR spectra showed to be pure product (0.510 g, 55%).

Method B

Complex 12 (272 mg, 0.437 mmol) was placed in a Schlenk flask with toluene (50 mL). Solid MeLi (28 mg, 0.874 mmol, 69% MeLi) was added and the mixture was stirred for 1 hour. A $^1$H NMR spectrum showed that the reaction had not gone to completion so it was allowed to stir for another hour. $^1$H NMR spectroscopy showed that the reaction had finished. The solution was pumped to dryness and the resulting solid was dissolved in benzene and filtered through Celite. The filtrate was pumped almost to dryness, layered with hexanes and placed in the freezer overnight to yield a light beige solid. $^1$H NMR (C$_6$D$_6$): δ 7.51–7.46 and 7.15–6.92 (br m, 20H, C$_6$H$_5$), 6.11 (s, 5H, C$_5$H$_5$), 4.24 (d, 4H, CH$_2$Ph, $^3$J$_{HP}$=23.5 Hz), 0.53 (s, 6H$_1$, ZrCH$_3$). $^{13}$C{H} NMR (C$_6$D$_6$): δ 142.6, 132.6–126.5 (C$_6$H$_5$),111.8 (C$_5$Hs), 50.3 (CH$_2$Ph), 39.4 (ZrCH$_3$). $^{31}$P{H} NMR (CH$_2$Cl$_2$): δ 45.2.

Cp[Ph$_2$P(N-p-tolyl)$_2$]ZrMe$_2$ (15)

Method A

Complex 13 (0.800 g, 1.28 mmol) was placed in a Schlenk flask and THF (25 mL) was added. The mixture was cooled to 0° C. and MeMgBr (0.988 mL, 2.57 mmol) was added rapidly via syringe. The solution was allowed to warm up to room temperature and stirred for 10 minutes. Then the solution volume was reduced to about 2 mL and 25 mL of toluene was added and the volume reduced again. This process was repeated about 3–4 times until no more THF was seen in the $^1$H NMR spectrum. The residual solid was dissolved in a small amount of CH$_2$Cl$_2$ and the volume was reduced to about 1–2 mL and hexanes (20 mL) were added. The process was repeated 2–3 times to produce a white precipitate which $^1$H NMR spectra showed to be pure product (0.550 g, 74%).

Method B

Complex 13 (1.193 g, 1.92 mmol) was placed in a Schlenk flask with toluene (50 mL). Solid MeLi (122 mg, 3.84 mmol, 69% MeLi) was added and the mixture was stirred for 2 hours. The solution was pumped to dryness and the resulting solid was dissolved in benzene and filtered through Celite. The filtrate was pumped almost to dryness, layered with hexanes and placed in the freezer overnight to yield a light beige solid (830 mg, 73%) $^1$H NMR (THF-d$_8$): δ 7.70–7.42 (br m, 10H, C$_6$H$_5$); 6.76 (d, 4H, m-C$_6$H$_4$CH$_3$, $^3$J$_{HH}$=8.2 Hz), 6.47 (dd, 4H, o-C$_6$H$_4$CH$_3$, $^3$J$_{HH}$=8.2 Hz, $^4$J$_{HP}$=1.7 Hz), 6.09 (s, 5H, C$_5$H$_5$), 2.13 (s, 6H, C$_6$H$_4$CH$_3$), 0.03 (s, 6H, ZrCH$_3$). $^{13}$C{H} NMR (C6D6): δ 144.8, 133.2–125.8 (C6H5 and C$_6$H$_4$CH$_3$), 112.4 (C$_5$H$_5$), 39.8 (ZrCH$_3$), 20.5 (C$_6$H$_4$CH$_3$). $^{31}$P{H} NMR (C$_6$D$_6$): δ 35.6.

Cp[Ph$_2$P(NSiMe$_3$)$_2$]ZrCl$_2$ (16)

A solution of ligand 1 (1.400 g, 3.88 mmol) in toluene (100 mL) was slowly added to a solution of CpZr(NMe$_2$)$_3$ (1.120 g, 3.88 mmol) in toluene to form a yellow solution.

This solution was stirred for 10 minutes and then NMe$_2$H$_2$Cl (0.633 g, 7.77 mmol) was added and the mixture was allowed to stir overnight until all the solid had dissolved. The solution became colorless overnight. The solvent was removed in vacuo and the resulting solid was dissolved in about 5 mL of CH$_2$Cl$_2$ to which 20 mL of hexanes were added. The volume was reduced to about 5 mL and another 20 mL of hexanes were added. This process was repeated several times until a large amount of white solid precipitated. This gave 1.80 g (79%) of a pure (by $^1$H NMR spectroscopy) white solid. $^1$H NMR (C$_6$D$_6$): δ 7.85–7.77 and 7.11–7.01 (br m, 10H, C$_6$H$_5$), 6.57 (s, 5H, C$_5$H$_5$), 0.003 (s, 18H, SiCH$_3$). $^{13}$C{H}NMR(CDCl$_3$): δ 132.6, 132.4, 132.2 and 128.9, 128.7, 128.4 (d, o, m, p-C$_6$H$_5$, J$_{CP}$=275 Hz), 116.3 (C$_5$H$_5$), 2.80 (SiCH$_3$). $^{31}$P(H) NMR (CH$_2$Cl$_2$): δ 22.2. Analysis calculated for C$_{23}$H$_{33}$PN$_2$Si$_2$ZrCl$_2$: C, 47.08; H, 5.67; N, 4.77. Found: C, 48.15; H, 5.70; N, 4.25.

Cp[Et$_2$P(NSiMe$_3$)$_2$]ZrCl$_2$ (17)

A solution was made of ligand 2 (0.700 g, 2.65 mmol) and CpZr(NMe$_2$)$_3$ (0.764 g, 2.65 mmol) in toluene (100 mL). The yellow solution was allowed to stir for about 10 minutes and then NMe$_2$H$_2$Cl (0.432 g, 7.56 mmol) was added. The solution rapidly turns colorless and was allowed to stir overnight. In the same manner as described for the preparation of 16, the solvent was removed under vacuum and the resulting solid was recrystallized from CH$_2$Cl$_2$/hexanes. This gave an initial batch of white, single crystals (0.580 g) and the filtrate was further concentrate to yield another 0.515 g of a pure white powder (total=1.095 g, 85%). $^1$H NMR (C$_6$D$_6$): δ 6.40 (s, 5H, C$_5$H$_5$), 1.10 (dq, 4H, CH$_2$CH$_3$), 0.85 (dt, 6H, CH$_2$CH$_3$). $^{13}$C{H}NMR(CDCl$_3$): δ 116.2 (C$_5$H$_5$), 25.2 (d, CH$_2$CH$_3$, $^1$J$_{CP}$=65 Hz), 5.07 (d, CH$_2$CH$_3$, $^2$J$_{CP}$=6.0 Hz), 2.70 (d, SiCH$_3$, $^3$J$_{CP}$=2.9 Hz). $^{31}$P{H} NMR (CH$_2$Cl$_2$): δ 44.2. Analysis calculated for C$_{15}$H$_{33}$PN$_2$Si$_2$ZrCl$_2$: C, 36.72; H, 6.78; N, 5.71. Found: C, 36.50; H, 6.56;N, 5.54.

Cp[Ph$_2$P(NSiMe$_3$)$_2$]ZrMe$_2$ (18)

Complex 16 (1.50 g, 2.56 mmol) was placed in a Schlenk flask with toluene (100 mL). Solid MeLi (163 mg, 5.12 mmol, 69% MeLi) was added and the mixture was stirred for 2 hours. The solution was pumped to dryness and the resulting solid was dissolved in benzene and filtered through Celite. The filtrate was pumped almost to dryness, layered with hexanes and placed in the freezer overnight to yield a white solid (1.21 g, 2.21 mmol, 86%). $^1$H NMR (C$_6$D$_6$): δ 7.94–7.87 and 7.15–7.08 (br m, 10H, C$_6$H$_5$), 5.42 (s, 5H, C$_5$H$_5$), 0.63 (s, 6H, ZrCH$_3$), –0.12 (s, 18H, SiCH$_3$). 13C{H}NMR(C$_6$D$_6$): δ 132.1, 131.9 and 131.7 (C$_6$H$_5$) (other half of signals buried under C$_6$D$_6$), 112.4 (C$_5$H$_5$), 44.3 (ZrCH$_3$), 3.35 (SiCH$_3$). $^{31}$P{H} NMR (CH$_2$Cl$_2$): δ 24.8.

Cp[Et$_2$P(NSiMe$_3$)$_2$]ZrMe$_2$ (19)

Complex 17 (1.00 g, 2.04 mmol) was placed in a Schienk flask with toluene (100 mL). Unsolvated MeLi (130 mg, 4.08 mmol, 69% MeLi) was added and the mixture was stirred overnight. The solution was pumped to dryness and the resulting solid was dissolved in benzene and filtered through Celite. The filtrate was pumped to dryness to yield a white solid (0.800 g, 1.78 mmol, 87%). $^1$H NMR (C$_6$D$_6$): δ 6.25 (s, 5H, C$_5$H$_5$), 1.28–1.20 (m, CH$_2$CH$_3$), 1.02–0.91 (m, CH$_2$CH$_3$), 0.43 (s, 6H, ZrCH$_3$), 0.072 (s, 18H, SiCH$_3$). $^{13}$C NMR: 3112.3 (C$_5$H$_5$), 42.6 (ZrCH$_3$), 25.8 (CH$_2$CH$_3$, $^1$J$_{CP}$=65.4 Hz), 5.08 (CH$_2$CH$_3$, $^2$J$_{CP}$=6.04 Hz), 3.28 (SiCH$_3$). $^3$tP{H} NMR (CH$_2$Cl$_2$): δ 44.9.

N-Benzyldiphenylphosphinamide (20)

The same procedure for preparation of 6 was followed (Method A). In this case however, the expected product was not formed; instead, 20 was isolated as colorless crystals in 92% yield. $^1$H NMR (CDCl$_3$): δ 8.0–7.2 (20H, aromatic protons), 4.12 (t, 2H, NCH$_2$Ph, $^3$JPH and $^3$J$_{HH}$=7.5 Hz), 3.13 (m, 1H, NH); $^{31}$P{$^1$H} NMR (CH$_2$Cl$_2$): 3–6.4.

[Ph$_2$P(N-p-tolyl)$_2$]$_2$TiCl$_2$ (21)

Phosphonium salt 5 (3.55 g, 8.21 mmol) was dissolved with 150 ml dry CH$_2$Cl$_2$ in a 500 mL Schlenk flask. A 50 mL toluene solution of Ti(NMe$_2$)$_4$ (0.918 g, 4.09 mmol) was added to the flask rapidly by syringe. The reaction mixture was stirred for 30 minutes and volatiles were removed under vacuum. The remaining solid was dissolved with 50 mL CH$_2$Cl$_2$, and 100 mL hexane was carefully added on the top of the CH$_2$Cl$_2$ layer. The mixture was left undisturbed overnight, and purple crystals formed. These crystals contained one equivalent of CH$_2$Cl$_2$ solvent (as shown by NMR and elemental analysis). The solvent free complex 6 was obtained by dissolving the crystals in toluene and then removing the volatiles. Yield: 3.16 g (3.48 mmol, 85%). $^1$H NMR (CDCl$_3$): δ 7.4–6.8 (36H, aromatic protons), 2.27 (s, 12H, NPhCH$_3$); $^{13}$C{$^1$H} NMR (CDCl$_3$): δ 146.4, 134.0, 133.8, 132.8, 132.5, 128.8, 128.1, 127.9, 125.2 (aromatic carbons), 20.9 (NPhCH$_3$); $^{31}$P{$^1$H} NMR (CH$_2$Cl$_2$): δ 36.5. Analysis calculated for C$_{53}$H$_{50}$N$_4$P$_2$Cl$_4$Ti: C, 64.07; H, 4.97; N, 5.64. Found: C, 64.35; H, 4.94; N, 5.72.

[Ph$_2$P(NCH$_2$Ph)$_2$]$_2$TiCl$_2$ (22)

A similar procedure to that used for the preparation of 21 was followed for the synthesis of 22, except that bright yellow crystals of complex 22 were obtained by crystallization from CH$_2$Cl$_2$ and hexane. Yield: 82%. $^1$H NMR (CDCl$_3$): δ 7.5–6.9 (40H, aromatic protons), 4.65 (d, 8H, NCH$_2$Ph, $^3$J$_{PH}$=25.5 Hz); $^{13}$C{$^1$H} NMR (CDCl$_3$): δ 141.0, 133.7, 133.5, 132.2, 132.2, 129.2, 128.0, 127.8, 127.5, 126.6 (aromatic carbons), 55.3 (NCH$_2$Ph); $^{31}$P{$^1$H} NMR (CH$_2$Cl$_2$): δ 47.3. Analysis calculated for C$_{52}$H$_{48}$N$_4$P$_2$Cl$_2$Ti: C, 68.66; H, 5.32; N, 6.15. Found: C, 69.05; H, 5.14; N, 6.00.

[Ph$_2$P(N-ptolyl)$_2$]$_2$TiMe$_2$ (23)

Complex 21(1.40 g, 1.54 mmol) was dissolved with 150 mL toluene in a 500 mL Schienk flask and the resulting solution was cooled to 0° C. A solution of MeMgBr in ether (1.2 ml, 2.6 M, 3.1 mmol) was added to the flask rapidly by syringe which resulted in an immediate color change from deep red to yellow. The reaction mixture was allowed to stir for 30 minutes at 0° C., and volatiles were then removed under vacuum. The remaining material was extracted with toluene. The volume of extract was reduced to 15 mL; layering this solution with 30 mL hexane provided 1.0 g crystals. Yield: 75%. $^1$H NMR (CDCl$_3$): δ 7.5–6.6 (36H, aromatic protons), 2.25 (s, 6H, NPhCH$_{3a}$), 2.24 (s, 6H, NPhCH$_{3b}$), 1.23 (TiCH$_3$); $^{13}$C{$^1$H} NMR (CDCl$_3$): d 145.5, 133.6, 133.5, 133.4, 133.3, 131.7, 131.6, 131.4, 130.9, 130.1, 128.8, 128.0, 127.8, 125.7, 125.6 (aromatic carbons), 69.9 (TiCH$_3$), 20.8 (NPhCH3); $^{31}$P{$^1$H} NMR (CH$_2$Cl$_2$): δ 38.0. Analysis calculated for C$_{54}$H$_{54}$N$_4$P$_2$Ti: C, 74.64; H, 6.26; N, 6.44. Found: C, 74.40; H, 5.89; N. 5.93.

[Ph$_2$P(NCH$_2$Ph)$_2$]$_2$TiMe$_2$ (24)

Complex 22 (1.22 g, 1.34 mmol) was dissolved with 100 mL toluene in a 250 mL flask and the resulting solution was cooled to –30° C. A solution of MeLi in ether (1.63 mL, 1.65 M, 2.68 mmol) was added rapidly. The reaction mixture was allowed to warm up to room temperature and stirred for 30 minutes. Complex 24 (0.95 g, 1.10 mmol) was isolated as orange red crystals after following the same work up procedure described for 23. Yield: 82%. $^1$H NMR (CDCl$_3$): δ 7.5–6.9 (40H, aromatic protons), 4.24 (d, 8H, NCH$_2$Ph, $^3$J$_{PH}$=27.1 Hz), 1.30 (s, 6H, TiCH$_3$); $^{13}$C{$^1$H} NMR (CDCl$_3$): 142.9, 133.2, 133.0, 131.7, 131.2, 129.9, 129.3, 128.4, 128.0, 127.9, 127.6, 125.8 (aromatic carbons), 62.7 (TiCH$_3$), 51.7 (NCH$_2$Ph); $^{31}$P{$^1$H})NMR (CH$_2$Cl$_2$): δ 49.9.

Analysis calculated for $C_{54}H_{54}CN_4P_2Ti$: C, 74.64; H, 6.26; N, 6.44. Found: C, 74.21; H. 5.96; N, 6.55.

Cp[Ph$_2$P(N-p-tolyl)$_2$]TiMe$_2$ (25)

CpTiCl$_3$ (1.00 g, 4.56 mmol) was dissolved with 100 mL toluene in a 500 mL Schienk flask and was cooled to −30° C. A solution of methyllithium in 8.5 mL ether (1.6 M, 13.6 mmol) was added to the flask rapidly by syringe. The reaction mixture was stirred at −30° C. for 5 minutes and then 25 mL of a toluene solution of ligand 6 (1.80 g, 4.56 mmol) was added rapidly. The mixture was allowed to warm up to room temperature and stirred for 30 minutes. Volatiles were removed under vacuum. The remaining material was extracted with toluene. Removal of toluene from the extract gave an o range red powder which was further purified by recrystallization from toluene/hexane mixture to give orange red crystals. Yield: 1.74 g (3.23 mmol, 71%). $^1$H NMR (CDCl$_3$): δ 7.8–7.5 (20H, phenyl protons), 6.80 (d, 4H, $^3J_{HH}$=8.2 Hz), 6.38 (d, 4H, $^3J_{HH}$=8.3 Hz), 6.42 (s, 5H Cp-protons), 2.16 (s, 6H, NPhCH$_3$), 0.65 (s, 6H, TiCH$_3$); $^{13}$C{$^1$H} NMR (CDCl$_3$): δ 145.1, 133.0, 132.8, 132.2, 130.8, 130.6, 129.6, 129.0, 128.6, 128.5, 124.6, 124.4 (aromatic carbons), 114.9 (Cp-carbons), 64.9 (TiCH$_3$), 20.6 (NPhCH$_3$); $^{31}$P{$^1$H} NMR (CH$_2$Cl$_2$): δ 28.4. Analysis calculated for $C_{31}H_{29}N_2$PTi: C, 73.47; H, 6.54; N, 5.19. Found: C, 73.64; H, 6.48; N, 5.32.

Cp[Ph$_2$P(NCH$_2$Ph)$_2$]TiMe$_2$ (26)

The same procedure described for the preparation of 25 was followed to synthesize 26. Yield: 50%. $^1$H NMR (CDCl$_3$): δ 7.7–6.7 (20H, aromatic protons), 5.96 (s, 5H, Cp-protons), 4.04 (d, 4H, NCH$_2$Ph, $^3J_{PH}$=22.5 Hz), 0.54 (s, 6H, TiCH$_3$); $^{13}$C{$^1$H} NMR (CDCl$_3$): 8142.2, 142.1, 132.5, 132.4, 131.7, 128.6, 128.5, 128.4, 127.7, 126.2 (aromatic carbons), 114.2 (Cp-Carbons), 60.3 (TiCH$_3$), 50.9 (NCH$_2$Ph); $^{31}$P{$^1$H} NMR (CH$_2$Cl$_2$): δ 38.2. Analysis calculated for $C_{31}H_{29}N_2$PTi: C, 73.47; H, 6.54; N, 5.19. Found: C, 73.68; H, 6.45; N, 5.12.

Cp[Ph$_2$P(=O)NCH$_2$Ph]TiMe$_2$ (27)

The same procedure used for the preparation of 25 was followed to synthesize 27. Complex 27 was isolated as orange red crystals in 67% yield. $^1$H NMR (CDCl$_3$): δ 7.8–6.7 (15H, aromatic protons), 6.16 (s, 5H, Cp-protons), 4.42 (d, 2H, NCH$_2$Ph, $^3J_{PH}$=20.8 Hz), 0.71 (s, 6H, TiCH$_3$); ($^{13}$P{$^1$H} NMR (CDCl$_3$): δ 142.3, 133.0, 132.8, 132.7, 132.1, 131.6, 129.1, 129.0, 128.2, 126.7 (aromatic carbons), 115.6 (Cp-Carbons), 63.7 (TiCH$_3$), 51.4 (NCH$_2$Ph); $^{31}$P{$^1$H} NMR (CH$_2$Cl$_2$): δ 42.6. Analysis calculated for $C_{26}H_{28}$NOPTi: C, 69.49; H, 6.28; N, 3.12. Found: C, 69.94; H, 6.03; N, 2.74.

Polymerization Results

Two general procedures were followed for the polymerization of ethylene by these zirconium catalysts. Method A was followed when MAO was used as cocatalyst whereas Method B was used for cationic initiators such as [Ph$_3$C][B(C$_6$F$_5$)$_4$]. The results are summarized in Tables 1 and 2.

Method A

The autoclave was first heated for 2 hours at 100° C. under vacuum. The reactor was then refilled with N$_2$ and charged with 450 mL of toluene followed by MAO in 25 mL of toluene. The reactor was then saturated with C$_2$H$_4$ at 75 psig and the indicated temperature; the pre-catalyst was then added.

Method B

The reactor was conditioned as above. Instead of MAO, the reactor was charged with trimethylaluminum (15 μmol) or tri-iso-butylaluminum (65 μmol) followed by saturation with C$_2$H$_4$. The precatalyst was mixed with the cocatalyst and the mixture was added to the reactor.

TABLE 1

Ethylene Polymerization with Zirconium Complexes in the Presence of MAO[a]

| Entry | Catalyst | Zr (μmol) | T (C) | Al:Zr | Activity[b] | M$_n$ (K) | M$_w$/M$_n$ |
|---|---|---|---|---|---|---|---|
| | Bis(PN$_2$) Complexes | | | | | | |
| 1 | 8 (N-p-tolyl, Cl$_2$) | 5 | 70 | 2000 | 2500 | 78.7 | 3.55 |
| 2 | 8 (N-p-tolyl, Cl$_2$) | 5 | 40 | 2000 | 7900 | 143.8 | 2.07 |
| 3 | 10 (N-p-tolyl, Me$_2$) | 5 | 70 | 2000 | 2900 | | |
| 4 | 10 (N-p-tolyl, Me$_2$) | 5 | 50 | 2000 | 6900 | 190.4 | 2.68 |
| 5 | 9 (N-CH$_2$Ph, Me$_2$) | 5 | 70 | 2000 | 2200 | 213.2 | 2.27 |
| | Mixed Cp(PN$_2$) Complexes | | | | | | |
| 6 | 17 (NTMS, Cl$_2$) | 10 | 40 | 1000 | 660 | | |
| 7 | 17 (NTMS, Cl$_2$) | 10 | 70 | 1000 | 8400 | 93.4 | 2.45 |
| 8 | 19 (NTMS, Me$_2$) | 11 | 70 | 300 | 840 | 8.4 | 7.76 |

TABLE 2

Ethylene Polymerization in the Presence of Single Component Activators Using Catalyst 19[a]

| Entry | AlR$_3$ (μmol) | Zr (μmol) | T (C) | Cocatalyst | MAO (mmol) | A[b] | M$_n$ (K) | M$_w$/M$_n$ |
|---|---|---|---|---|---|---|---|---|
| 1 | None | 11 | 70 | None | 3.3 | 840 | 8.4 | 7.76 |
| 2 | TMA (15) | 11 | 70 | B(Ar$_F$)$_3$ | 0 | 0 | | |
| 3 | TMA (15) | 11 | 70 | [Ph$_3$C][B(Ar$_F$)$_4$] | 0 | 0 | | |
| 4 | None | 11 | 70 | [Ph$_3$C][B(Ar$_F$)$_4$] | 3.3[c] | 1400 | 15.0 | 7.67 |
| 5 | TMA (15) | 11 | 70 | [Ph$_3$C][B(Ar$_F$)$_4$] | 3.3[d] | 2200 | 110.5 | 2.87 |
| 6 | TMA (15) | 11 | 70 | [Ph$_3$C][B(Ar$_F$)$_4$] | 3.3[d] | 2400 | | |
| 7 | None | 11 | 60 | [Ph$_3$C][B(Ar$_F$)$_4$] | 3.3[d] | 5300 | 114.7 | 3.09 |

TABLE 2-continued

Ethylene Polymerization in the Presence of Single Component Activators Using Catalyst 19[a]

| Entry | AlR$_3$ ($\mu$mol) | Zr ($\mu$mol) | T (C) | Cocatalyst | MAO (mmol) | A[b] | M$_n$ (K) | M$_w$/M$_n$ |
|---|---|---|---|---|---|---|---|---|
| 8 | TMA (15) | 11 | 60 | [Ph$_3$C][B(Ar$_F$)$_4$] | 3.3[d] | 1700 | 158.6 | 2.61 |
| 9 | TMA (15) | 11 | 70 | [Ph$_3$C][B(Ar$_F$)$_4$][e] | 0 | 410 | 29.9[f] | 7.53 |
| 10 | TIBAL (65) | 11 | 70 | [Ph$_3$C][B(Ar$_F$)$_4$][e] | 0 | 1500 | | |
| 11 | TIBAL (25) | 11 | 70 | [Ph$_3$C][B(Ar$_F$)$_4$][e] | 0 | 570 | | | a) for a general procedure see Method B above: b) activity in Kg PE/mol Zr x h; c) complex 19 injected into a solution of cocatalyst and MAO in toluene; d) complex 19 injected into a solution of cocatalyst and TMA in toluene, pre-saturated with monomer; MAO subsequently introduced after a period of several minutes with no polymerization activity; e) complex 19 and cocatalyst pre-mixed in toluene prior to introduction into the reactor, pre-saturated with monomer in the presence of AlR$_3$; f) bimodal MWD with low (ca. 8 K) and high (ca. 132 K) MW components; similar comments apply to entries 1 and 4, although the separate distributions have not been analyzed.

A further series of experiments were conducted. In these experiments the following reagents and procedures were used. The ethylene was polymer grade which was then passed through a series of adsorption columns to remove oxygen, moisture and oxygenated compounds. The solvent/diluent was cyclohexane which was also purified by passing through/over molecular sieves. In some experiments MAO was used as a cocatalyst. The MAO was obtained from AKZO NOBEL. In other experiments the activator was trityl borate purchased from Asahi Glass Inc. used in the presence of MAO which is believed to act as a scavenger.

Solution Semi-Batch Reactor (SBR) Reactions

A series of polymerizations were conducted in a 500 mL Autoclave engineers Zipperclave reactor having an air driven stirrer and automatic temperature control. In the experiments 216 mL of solvent was used. The catalyst concentrations was 200 $\mu$mol/L, the cocatalyst was either trityl borate (210 $\mu$mol/L) or MAO (Al:M (transition metal) 300:1 mole ratio) in the presence of 1 mmol/L of scavenger (with trityl borate activation). The reaction temperature was 160° C. and the pressure was 0.966 Mpa gage (140 psig). The rate of stirring was 2,000 rpm. The reaction time was typically 10 minutes and the reaction was terminated by adding 5 mL of a methanol to the reactor. In this series of experiments Cp$_2$ZrCl$_2$ was used as the reference standard. The polymer was recovered by evaporation of the solvent. The molecular weight and molecular weight distribution of the resulting polymer were determined by GPC (Waters 150-C at 140° C. in 1,2,4 trichlorobenzene calibrated using polyethylene standards).

The results are set forth in Table 3 below.

TABLE 3

Results of SBR reactions

| Catalyst | Code | Cocatalyst | Activity - g PE/mmol M*hr | Mn*10$^{-3}$ | Mw*10$^{-3}$ | Mz*10$^{-3}$ | PD |
|---|---|---|---|---|---|---|---|
| (P~N~N)2ZrCl$_2$; tol | (8) | MAO | 288.10 | 15.50 | 39.50 | 81.40 | 2.55 |
| (P~N~N)2ZrCl$_2$; tol | (8)[1] | MAO | 668.40 | 44.80 | 103.90 | 176.80 | 2.32 |
| (P~N~N)2ZrCl$_2$; bez | (7) | MAO | 98.98 | 41.20 | 167.60 | 393.50 | 4.07 |
| Cp(P-N-N-)ZrCl$_2$; tol | (13) | MAO | 331.08 | 0.79 | 8.58 | 61.80 | 10.86 |
| Cp(P-N-N-)ZrCl$_2$; tol | (13) | MAO | 391.21 | | | | |
| (P-N-N)2ZrMe$_2$; tol | (10) | Tritylborate | 46.89 | 1.61 | 15.40 | 538.80 | 9.57 |
| (P-N-N)2ZrMe$_2$; tol | (10) | Tritylborate | 36.78 | | | | |
| (P~N~N)2Zr(CH$_2$Ph)$_2$; tol | (11) | Tritylborate | 52.12 | 46.90 | 515.40 | 1167.00 | 10.99 |
| CpZr(P~N~N)Cl$_2$; bez | (12) | MAO | 243.76 | 0.51 | 6.31 | 24.10 | 12.37 |
| (P~N~N)2TiCl$_2$; tot | (21) | MAO | 22.41 | | | | |
| (P~N~N)2TiCl$_2$; bez | (22) | MAO | 29.23 | | | | |
| CpZr(P-N-N)Me$_2$; tol | (15) | Tritylborate | 1783.30 | 1.77 | 3.21 | 5.14 | 1.81 |
| CpZr(P-N-N)Me$_2$; tot | (15) | Tritylborate | 1485.37 | 1.77 | 3.46 | 5.79 | 1.95 |
| CpTi(P-N-N)Me$_2$; tot | (25) | Tritylborate | 5.06 | | | | |
| CpTi(P-N-N)Me$_2$; tol | (25) | Tritylborate | 9.24 | 2.07 | 33.80 | 373.70 | 16.33 |
| CpZr(P-N-N)Me$_2$; bez | (14) | Tritylborate | 162.90 | 6.12 | 46.30 | 812.20 | 7.57 |
| CpZr(P~N~N)Cl$_2$; TMS | (17) | MAO | 50.07 | 4.22 | 13.00 | 29.00 | 3.08 |
| CpTi(P~N~O)Me$_2$ | (27) | Tritylborate | 97.30 | 118.00 | 336.30 | 770.90 | 2.86 |
| Cp$_2$ZrCl$_2$ | | MAO | 887.00 | 2.60 | 8.0 | 17.00 | 3.00 |

[1]The catalyst and cocatalyst was premixed before injection into the reactor.

Slurry Phase Semi-batch (CSU) Reactions

A further series of experiments were conducted using a slurry phase semi-batch reactor. The feed streams and solvent/diluent were essentially the same as for the solution semi-batch reactor (SBR) noted above. However the temperature of the CSU reactor is controlled at about 35° C. using a water jacket and a circulating water bath. Further, the total pressure in the reactor is lower 0.069 Mpa (gage) (IO psig). The reaction time is longer—in the order of 30 minutes. The stirring speed is 2250±300 rpm (initially). The reaction is terminated by stopping the flow of ethylene to the reactor and stopping the stirrer. When the catalyst is activated by MAO the ratio of Al:transition metal is 500:1 and the catalyst concentration is 50 μmol/L. The volume of diluent used is 300 mL. After the reaction is stopped the reaction products are quantatively recovered and the catalyst activity is determined. In this series of experiments $Cp_2ZrCl_2$ was used as a reference standard. The results of the experiment are set forth in Table 4 below. The catalyst codes are the same as those used in reporting the synthesis of the catalyst.

TABLE 4

Results of CSU Reactions

| Catalyst Code | Cocatalyst | Activity (g PE/mmol M * hr) |
|---|---|---|
| $Cp_2ZrCl_2$ † (Aldrich 02325CF) | MAO | 2584 |
| (13) † | MAO | 1849 |
| (15) ‡‡ | MAO, C+B- | 958 |
| (27) ‡ | MAO, C+B- | 53 |

† CSU standard MAO screening conditions
‡ CSU Trityl borate (C+B-) screening conditions
‡‡ CSU Trityl borate (C+B-) screening conditions: (Metal mole ratio Al:M:B = 67:1:1.05)

Bench Scale Reactions—Gas Phase (BSR)

The BSR reactions were carried out in a 2 liter stirred reactor in a semi-batch process. The feed for the reactor was purified essentially as described above. The total pressure in the reactor is 1.38 kPa gage (200psig). The reaction temperature is 90° C. The stirring speed is 1800 rpm. The catalyst concentration is 10–50 mg of catalyst; at the loading of 0.1 mmol transition meta/g of catalyst. The cocatalyst is MAO supported on commercially available (from Witco) $SiO_2$ (25 weight % Al).

The reaction commences in the presence of 160 g of inert particulates. The comonomer is 1-butene (0–4%). The reaction time is 1 hour with no discharge. The reaction is terminated by venting the reactor. The polymer is quantatively recovered to determine reactivity and theproduct is analyzed as described for the SBR reactor. In this series of reactions bis-n-butyl cyclopentadienyl zirconium dichloride $((n-BuCp)_2ZrCl_2)$ was used as a reference standard.

The results of the experiment are set forth in Table 5 below.

TABLE 5

Results of BSR Reactions

| Catalyst Code | Activity g PE/mmol M[C2]hr | Polymer Properties | | |
|---|---|---|---|---|
| | | Mw*10⁻³ | ₃Mn*10⁻ | PD |
| (8) | 3905 | 534 | 6.5 | 82.0 |
| (7) | 1524 | 1014 | 14.0 | 71.9 |
| (8) | 2025 | 576 | 13.4 | 43.0 |
| (10) | 4794 | 502 | 5.5 | 91.3 |
| (13) | 4810 | 129 | 5.2 | 24.7 |
| (11) | 5673 | 128 | 43.0 | 3.0 |
| (12) | 371 | 171 | 4.2 | 40.8 |
| (15) | 13687 | 105 | 7.0 | 14.9 |
| (15) with Tritylborate | 1141 | 184 | 3.7 | 49.6 |
| (14) | 392 | 150 | 5.4 | 28.0 |
| (14) with Tritylborate | 197 | 737 | 104.0 | 7.1 |
| (21) | 102 | 729 | 101.0 | 7.2 |
| (22) | 57 | N/A | N/A | N/A |
| $(n-BuCp)_2ZrCl_2$ | 112272 | 107 | 55.0 | 1.9 |

What is claimed is:

1. A process for the polymerization of one or more olefins in the presence of a catalyst precursor having an empirical structure of the formula:

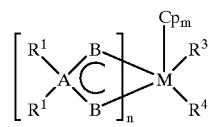

wherein A is selected from a phosphorus atom and an arsenic atom; each B is independently selected from the group consisting of an oxygen atom and a radical of the formula $NR^2$, wherein each $R^2$ is independently selected from the group consisting of a hydrogen atom, a $C_{1-10}$ alkyl radical which is unsubstituted or up to fully substituted by one or more halogen atoms, a $C_{6-10}$ aryl radical which is unsubstituted or up to fully subsituted by one or more halogen atoms, and trialkyl silyl radicals of the formula —$Si(R^5)_3$ wherein each $R^5$ is independently selected from the group consisting of a hydrogen atom and a $C_{1-4}$ alkyl radical; each $R^1$ is independently selected from the group consisitng of a hydrogen atom, a $C_{1-10}$ alkyl radical which is unsubstituted or up to fully substituted by one or more halogen atoms, and a $C_{6-10}$ aryl radical which is unsubstituted or up to fully subsituted by one or more halogen atoms; $R^3$ and $R^4$ are independently selected from the group consisting of a hydrogen atom, a halogen atom, a $C_{1-8}$ alkyl radical, and a $C_{6-10}$ aryl radical; M is a transition metal selected from the group consisiting of Ti, Zr, Hf and V; n is 1 or 2; m is 0 or 1 provided that the sum of n+m=2 and Cp is $C_{5-13}$ ligand containing a 5-member carbon ring having delocalized bonding within the ring and typically being bound to the transition metal M through covalent 5 bonds which is unsubstituted or up to fully substituted by one or more substituents selected from the group consisting of a halogen atom, a $C_{1-4}$ alkyl radical, and an amido radical which is unsubstituted or substituted by up to two $C_{1-4}$ alkyl radicals; and an activator.

2. The process according to claim 1, wherein said activator is selected from the group consisting of:
  i) an aluminoxane of the formula $R^6_2AlO(R^6AlO)_mAlR^4_2$ wherein each $R^6$ is independently selected from the group consisting of $C_{1-20}$ hydrocarbyl radicals and m is from 0 to 50;

ii) compounds of the formula [R⁷]⁺[B(R⁸)₄]⁻ wherein R⁷ is a cyclic C₅₋₇ aromatic cation or a triphenyl methyl anion and each R⁷ is independently selected from the group consisting of phenyl radicals which are unsubstituted or substituted with from 3 to 5 substituents selected from the group consisting of a fluorine atom, a C₁₋₄ alkyl or alkoxy radical which is unsubstituted or substituted by a fluorine atom; and a silyl radical of the formula —Si—(R¹⁰)₃; wherein each R¹⁰ is independently selected from the group consisting of a hydrogen atom and a C₁₋₄ alkyl radical; and iii) compounds of the formula [(R⁹)ₜZH ]⁺[B(R⁸) 4]⁻ wherein H is a hydrogen atom, Z is a nitrogen atom or phosphorus atom, t is 3 is Z is nitrogen or phosphorus and R⁹ is selected from the group consisting of C₁₋₈ alkyl radicals, a phenyl radical which is unsubstituted or substituted by up to three C₁₋₄ alkyl radicals, and R⁸ is as defined above; and iv) compounds of the formula B(R⁸)₃ wherein R⁸ is as defined above.

3. The process according to claim 2, wherein the precursor has the empirical formula:

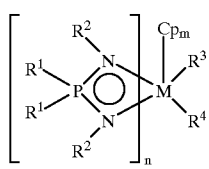

wherein each R¹ is independently selected from the group consisting of a hydrogen atom, a C₁₋₁₀ alkyl radical which is unsubstituted or up to fully substituted by one or more chlorine or fluorine atoms and a C₆₋₁₀ aryl radical which is unsubstituted or up to fully subsituted by one or more chlorine or fluorine atoms; each R² is independently selected from the group consisting of a hydrogen atom, a C₁₋₁₀ alkyl radical which is unsubstituted or up to fully substituted by one or more chlorine or fluorine atoms; a C₆₋₁₀ aryl radical which is unsubstituted or up to fully subsituted by one or more chlorine or fluorine atoms, and trialkyl silyl radicals of the formula —Si(R⁵)₃ wherein in each R⁵ is independently selected from the group consisting of a hydrogen atom and a C₁₋₄ alkyl radical; R³ and R⁴ are independently selected from the group consisting of a hydrogen atom, a chlorine or fluorine atom, a C₁₋₈ alkyl radical, and a C₆₋₁₀ aryl radical atoms; M is a transition metal selected from the group consisting of Ti, Zr, Hf and V; n is 1 or 2; m is 0 or 1 provided that the sum of n+m=2 and Cp is a cyclopentadienyl, indenyl or fluorenyl ligand which is unsubstituted or up to fully substituted by one or more substituents selected from the group consisting of a halogen atom, a C₁₋₄ alkyl radical and an amido radical which is unsubstituted or substituted by up to two C₁₋₄ alkyl radicals having delocalized bonding within the ring and typically being bound to the group metal (M) through covalent 72⁵-bonds.

4. The process according to claim 3, wherein each R¹ is independently selected from the group consisting of methyl, ethyl, and phenyl radicals.

5. The process according to claim 4, wherein each R² is independently selected from the group consisting of methyl, ethyl, phenyl, benzyl, tolulyl and trimethyl silyl radicals.

6. The process according to claim 5, wherein in R³ and R⁴ are independently selected from the group consisting of methyl, ethyl radicals, a chlorine atom, and a fluorine atom.

7. The process according to claim 6, wherein R³ and R⁴ are both a chlorine atom.

8. The process according to claim 7, wherein said activator is MAO and is present in an amount to provide a molar ratio of Al:M greater than 200:1.

9. The process according to claim 8, conducted in a gas phase at a pressure of up to 2068 kPa and at a temperature from 80° C. to 120° C.

10. The process according to claim 9, wherein said olefin is selected from the group consisting of ethylene, butene and hexene.

11. The process according to claim 10, wherein M is selected from the group consisting of Ti and Zr.

12. The process according to claim 11, wherein n is 2 and m is 0.

13. The process according to claim 11, wherein n is 1 and m is 1.

14. The process according to claim 8, conducted in a hydrocarbyl medium at a temperature less than 150° C. and a pressure from 20680 kPa to 34475 kPa.

15. The process according to claim 14, wherein said olefin is selected from the group consisting of ethylene, butene and hexene.

16. The process according to claim 15, wherein M is selected from the group consisting of Ti and Zr.

17. The process according to claim 16, wherein n is 2 and m is 0.

18. The process according to claim 16, wherein n is 1 and m is 1.

19. The process according to claim 8, conducted in a hydrocarbyl medium at a temperature from 160° C. to 280° C. and a pressure from 20680 kPa to 34475 kPa.

20. The process according to claim 19, wherein said olefin is selected from the group consisting of ethylene, butene and hexene.

21. The process according to claim 20, wherein M is selected from the group consisting of Ti and Zr.

22. The process according to claim 21, wherein n is 2 and m is 0.

23. The process according to claim 21, wherein n is 1 and m is 1.

24. The process according to claim 7, wherein R³ and R⁴ are independently selected from the group consisting of methyl and ethyl.

25. The process according to claim 24, conducted in a hydrocarbyl medium at a pressure from 20680 kPa to 34475 kPa in the presence of n activator selected from the group consisting of:

i) compounds of the formula [R⁷]⁺[B(R⁸)₄]⁻ wherein R7 is a cyclic C₅₋₇ aromatic cation or a triphenyl methyl anion and each R⁷ is independently selected from the group consisting of phenyl radicals which are unsubstituted or substituted with from 3 to 5 substituents selected from the group consisting of a fluorine atom, a C₁₋₄ alkyl or alkoxy radical which is unsubstituted or substituted by a fluorine atom; and a silyl radical of the formula —Si—(R¹⁰)₃; wherein each R¹⁰ is independently selected from the group consisting of a hydrogen atom and a C₁₋₄ alkyl radical; and ii) compounds of the formula [(R⁹)ₜZH]⁺[B(R⁸)₄]⁻ wherein H is a hydrogen atom, Z is a nitrogen atom or phosphorus atom, t is 2 or 3 is Z is nitrogen or phosphorus and R⁹ is selected from the group consisting of C₁₋₈ alkyl radicals, a phenyl radical which is unsubstituted or substituted by up to three C₁₋₄ alkyl radicals, and R⁸ is as defined above; and iii) compounds of the formula B(R⁸)₃ wherein R⁸ is as defined above.

26. The process according to claim 25, wherein said olefin is selected from the group consisting of ethylene, butene and octene.

27. The process according to claim 26, wherein M is selected from the group consisting of Ti and Zr.

28. The process according to claim 27, wherein n is 2 and m is 0.

29. The process according to claim 27, wherein n is 1 and m is 1.

30. The process according to claim 28, wherein said activator is $[Ph_3C][B(C_6F_5)_4]$.

31. The process according to claim 29, wherein said activator is $[Ph_3C][B(C_6F_5)_4]$.

32. The process according to claim 30, conducted at a temperature less than 150° C.

33. The process according to claim 31, conducted at a temperature less than 150° C.

34. The process according to claim 30, conducted at a temperature from 160° C. to 280° C.

35. The process according to claim 31, conducted at a temperature from 160° C. to 280° C.

* * * * *